(12) United States Patent
Tokuda et al.

(10) Patent No.: US 8,042,573 B2
(45) Date of Patent: Oct. 25, 2011

(54) FLUID CONTROL DEVICE

(75) Inventors: Ichiro Tokuda, Osaka (JP); Michio Yamaji, Osaka (JP); Tsutomu Shinohara, Osaka (JP); Kenji Tsubota, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 554 days.

(21) Appl. No.: 11/991,730

(22) PCT Filed: Jul. 21, 2006

(86) PCT No.: PCT/JP2006/314468
§ 371 (c)(1),
(2), (4) Date: Feb. 19, 2009

(87) PCT Pub. No.: WO2007/032147
PCT Pub. Date: Mar. 22, 2007

(65) Prior Publication Data
US 2009/0183792 A1 Jul. 23, 2009

(30) Foreign Application Priority Data
Sep. 12, 2005 (JP) .................. 2005-263231

(51) Int. Cl.
*F16K 11/10* (2006.01)
(52) U.S. Cl. .................................... 137/884
(58) Field of Classification Search ........... 137/269, 137/270, 271, 597, 884
See application file for complete search history.

(56) References Cited

U.S. PATENT DOCUMENTS

| | | | | |
|---|---|---|---|---|
| 6,502,601 B2 * | 1/2003 | Eidsmore et al. | ............ | 137/884 |
| 6,769,463 B2 * | 8/2004 | Vu | ............ | 141/98 |
| 6,874,538 B2 * | 4/2005 | Bennett | ............ | 137/884 |
| 7,320,339 B2 * | 1/2008 | Milburn | ............ | 137/884 |
| 7,334,605 B2 * | 2/2008 | Vu | ............ | 137/884 |
| 7,562,677 B2 * | 7/2009 | Perusek et al. | ............ | 137/884 |
| 7,841,628 B2 * | 11/2010 | Tokuda et al. | ............ | 285/124.5 |

FOREIGN PATENT DOCUMENTS

| | | |
|---|---|---|
| JP | 10-311450 | 11/1998 |
| JP | 11-351500 | 12/1999 |
| JP | 2003-091322 | 3/2003 |
| JP | 2003-322127 | 11/2003 |
| WO | WO-99/59392 | 11/1999 |
| WO | WO-2004/087560 | 10/2004 |

* cited by examiner

*Primary Examiner* — John Fox
(74) *Attorney, Agent, or Firm* — Edwards Angell Palmer & Dodge LLP

(57) ABSTRACT

A fluid control device that can be miniaturized without reducing a bolt diameter and a path diameter is provided.

A fluid controller 31 having an inlet port 31a and an outlet port 31b aligned in a line direction and a line-to-line connection port 31c positioned in the middle of the above ports in the line direction is supported by a pair of joint members 7, a stepped part 7a is formed at each upper surface of opposed parts of the joint members 7, and line-to-line connection path forming members 9 and 10 having line-to-line paths 13 and 18 each communicating with the line-to-line connection port 31c of the fluid controller 31, respectively and constituting line-to-line connecting means 8 are supported by the stepped parts 7a of the joint members 7.

6 Claims, 5 Drawing Sheets (a)

(b)

(a)

(b)

FLUID CONTROL DEVICE

TECHNICAL FIELD

The present invention relates to a fluid control device used in a semiconductor manufacturing device or the like, and more particularly, to an integrated fluid control device assembled such that a fluid controller can be individually taken out upward at the time of maintenance check.

In this specification, it is to be noted that the term of "vertical" designates a vertical direction in FIG. 1. This is for the sake of convenience, so that back and forth directions may be reversed and the vertical direction may be a lateral direction.

BACKGROUND ART

As a fluid control device used in a semiconductor manufacturing device, a patent document 1 discloses a device in which one line includes a plurality of fluid controllers disposed on the upper side and a plurality of joint members disposed on the lower side.

According to the fluid control device, as the fluid controller, a fluid controller having two ports and a fluid controller having three ports are used, and as the joint member, a joint member having two openings and a joint member having one opening are used, in which the fluid controller having the two ports are disposed over the two joint members having the two openings and the fluid controller having the three ports is disposed over the two joint members having the two openings, and the joint member having one opening and constituting line-to-line connecting means is disposed between the above two joint members. A gasket constituting a seal is provided at an abutment part between the path of the fluid controller and the path of the joint member, and two bolts are used for one seal in each fluid controller, so that the fluid controller having the two ports are fixed by the four bolts and the fluid controller having the three ports are fixed by the six bolts.

Patent Document 1: Japanese Unexamined Patent Publication No. 2003-322127.

DISCLOSURE OF THE INVENTION

Problems to be Solved by the Invention

According to the fluid control device disclosed in the above patent document 1, although the fluid controllers are connected and integrated without any tube, such integrated fluid control device is further required to be reduced in size. Although the size can be reduced by reducing a bolt diameter and a path diameter, when the bolt diameter is reduced, the problem is that strength and thrust force are insufficient and when the path diameter is reduced, the problem is that a flow amount is limited.

It is an object of the present invention to provide a fluid control device that can be reduced in size without being reduced in bolt diameter and path diameter.

Means for Solving the Problems

A fluid control device according to the present invention includes parallel lines each composed of a plurality of fluid controllers arranged on the upper side and a plurality of joint members arranged on the lower side to connect the fluid controllers, and line-to-line connecting means for connecting flow paths of the predetermined lines, in which the fluid controller having an inlet port and an outlet port arranged in a line direction and a line-to-line connection port positioned at the middle of the above ports in the line direction is supported by the pair of joint members, a stepped part is formed at each upper surface of opposed parts of the joint members, and a line-to-line connection path forming member having an upward opening path communicating with the line-to-line connection port of the fluid controller and constituting the line-to-line connecting means is supported by the stepped parts of the joint members.

The fluid controller disposed on the upper side includes a mass flow controller, an on-off valve, a regulator, a valve, a filter, a path block, and a joint, and the joint member disposed on the lower side includes the one having a V-shaped, U-shaped or L-shaped path in a rectangular solid block. The line-to-line connection path forming member is disposed on the lower side such that its upper surface is at the same level as that of the joint member.

It is preferable that the line-to-line connection path forming member is held between the fluid controller and the joint member by screwing a screw member for fixing the fluid controller to the joint member. In this case, while the conventional line-to-line connection path forming member has been connected to the fluid controller by the two bolts (screw members), this bolt can be omitted.

It is preferable that the line-to-line connection path forming member includes a T-shaped path forming member having a T-shaped path having openings at both ends in the direction perpendicular to the line and an upward opening, and an L-shaped path forming member having an L-shaped path having one closed end in the direction perpendicular to the lines and having an opening at the other end and an upward opening, and the line-to-line connecting means is constituted by interposing at least one T-shaped path forming member between the two L-shaped path forming member.

For example, each of the line-to-line connection path forming members is provided by forming a flange having a rectangular section, in a cylindrical body so as to be supported by the stepped parts of the joint members, and its upward opening path is provided so as to penetrate the flange. An annular gasket holding projection for constituting a seal is formed at this opening part.

For example, the fluid controller having the line-to-line connection port includes an on-off valve having an inlet port and an outlet port aligned in the line direction across a line-to-line connection port, in which a path communicating with the inlet port is provided in one of the adjacent joint members supporting the fluid controller and a path communicating with the outlet port is formed in the other joint member and the inlet port of the on-off valve is always in communication with the line-to-line connection port.

Effect of the Invention

According to the fluid control device in the present invention, since the path forming member constituting the line-to-line connecting means is supported by the stepped parts of the joint members, the line-to-line connecting means can be provided without increasing a length in the line direction, so that the fluid control device can be miniaturized.

Figure 1:
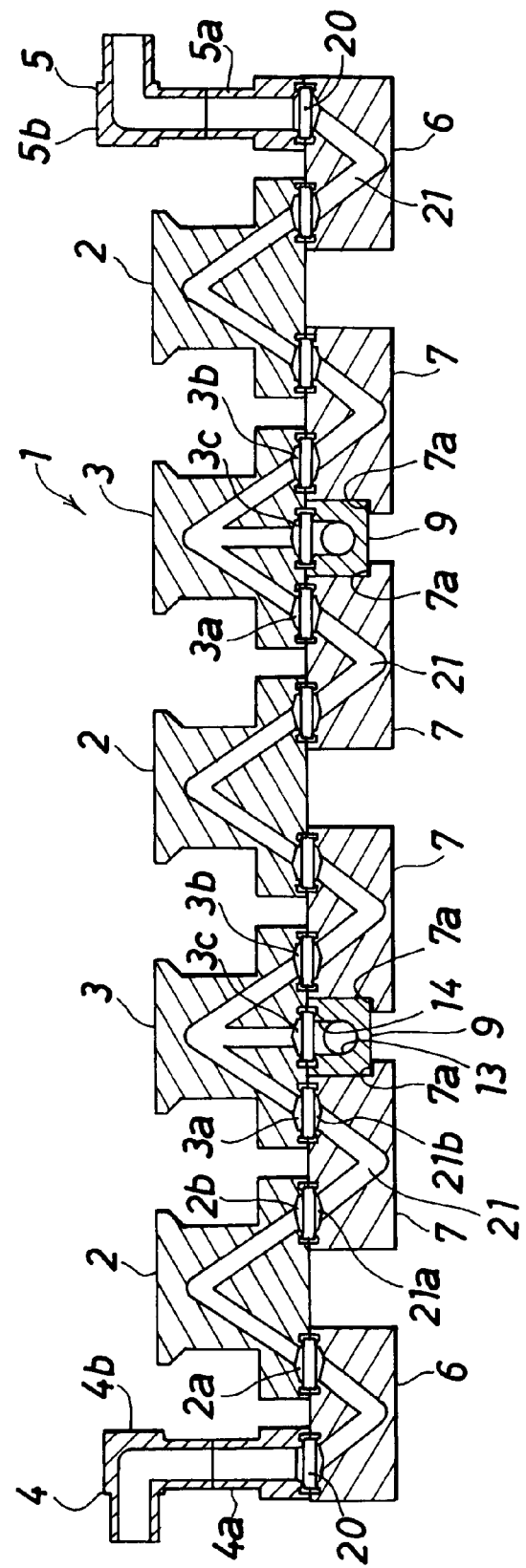
FIG. 1 is a vertical sectional view showing a fluid control device according to a first embodiment of the present invention.

EXPLANATION OF REFERENCES (1) line
(2) (3) fluid controller
(3a) inlet port
(3b) outlet port
(3c) line-to-line connection port
(6) (7) joint member
(7a) stepped part
(8) line-to-line connecting means
(9) (10) line-to-line connection path forming member
(13) T-shaped path
(14) upward opening path
(18) L-shaped path
(19) upward opening path
(21) path
(24) bolt
(31) on-off valve (fluid controller)
(31a) inlet port
(31b) outlet port
(31c) line-to-line connection port

BEST MODE FOR CARRYING OUT THE INVENTION

Embodiments of the present invention will be described with reference to the drawings hereinafter.

Figure 2:
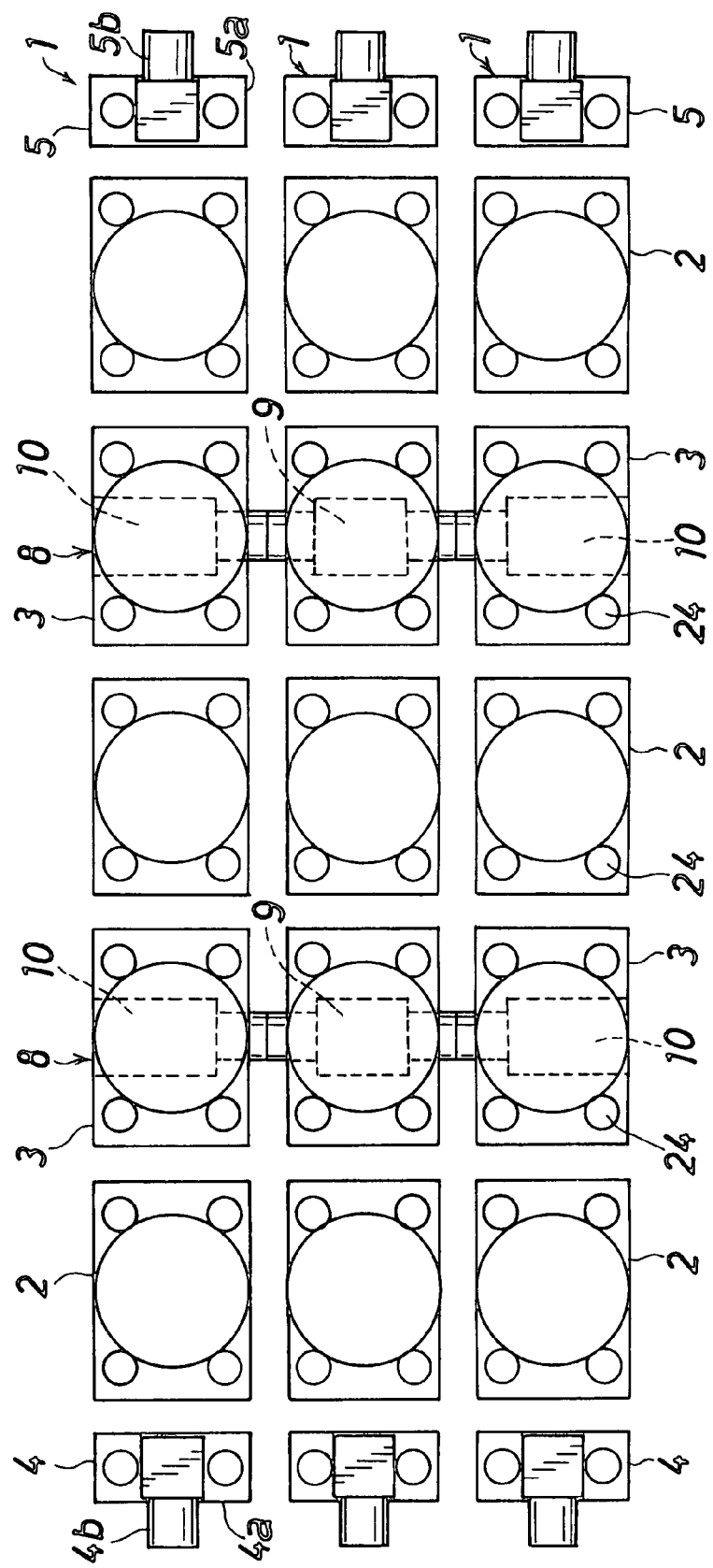
FIG. 2 is a plan view showing the same.
Figure 3:
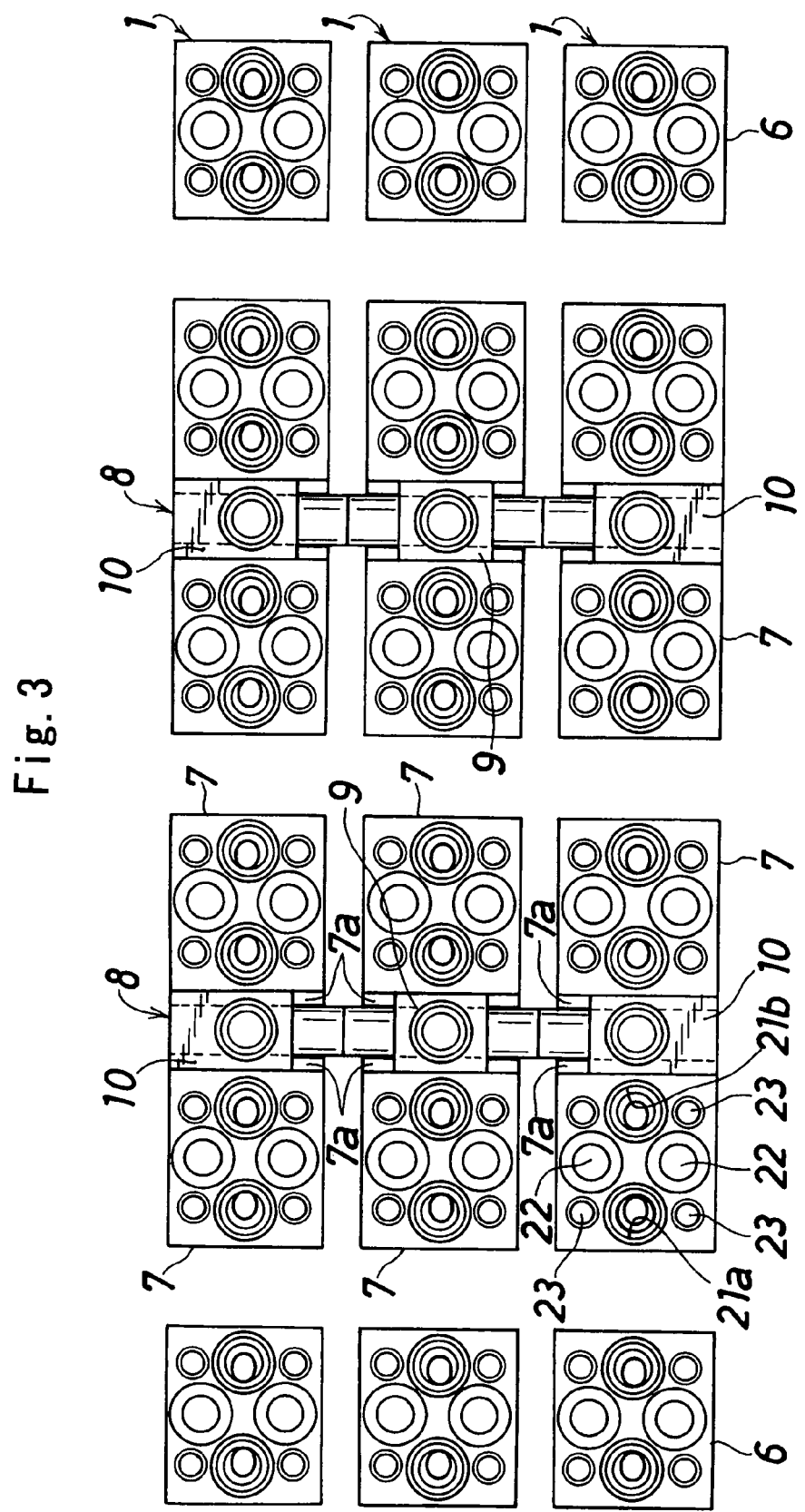
FIG. 3 is a plan view showing joint members disposed on the lower side.

FIGS. 1 to 3 show a fluid control device according to a first embodiment of the present invention.

A line (1) of a fluid control device includes a plurality of fluid controllers (2) and (3) disposed on the upper side, an inlet path forming joint (4) and an outlet path forming joint (5), and a plurality of joint members (6) and (7) and line connection path forming members (9) and (10) disposed on the lower side to support the fluid controllers (2) and (3), and the plurality of lines (1) are arranged in parallel with their inlets facing forward and their outlets facing backward, and paths of the predetermined lines (1) are connected by line connecting means (8) as shown in FIGS. 2 and 3, whereby the whole fluid control device is provided.

As shown in FIG. 1, as the fluid controllers (2) and (3), the one (shown as a path block) (2) having two ports (inlet port (2a)) and (outlet port (2b)) used for connection in the line direction only and the one (shown as a path block) (3) having three ports (inlet port (3a), outlet port (3b), and line-to-line connection port (3c)) used for connection between lines in the direction perpendicular to the line direction are used. The inlet ports (2a) and (3a) and the outlet ports (2b) and (3b) are provided at predetermined intervals in the line direction and the line-to-line connection port (3c) is provided exactly in between the inlet port (3a) and the outlet port (3b).

The inlet path forming joint (4) and the outlet path forming joint (5) include vertical cylinders (4a) and (5a) communicating with the opening of the joint member through seals (20) and L-shaped cylinders (4b) and (5b) welded to the vertical cylinders (4a) and (5a), respectively.

Each of the fluid controllers (2) and (3) is supported by the pair of joint members (6) and (7) that are adjacent in the line direction.

The pair of joint members (7) supporting the fluid controller (3) having the three ports (3a), (3b) and (3c) has stepped parts (7a) at upper surfaces of its opposed parts of the joint members (7), and the line-to-line connection path forming members (9) and (10) constituting the line-to-line connecting means (8) are supported by the stepped parts (7a) so that the upper levels thereof and the upper level of the joint members (7) are at the same level.

As the line-to-line connection path forming members (9) and (10), there are two kinds such as a T-shaped path forming member (9) having a T-shaped path, and an L-shaped path forming member (10) having an L-shaped path, respectively and at least one (one in the drawing) T-shaped path forming member (9) is provided between the two L-shaped path forming members (10) to form the line connecting means (8).

Figure 4:
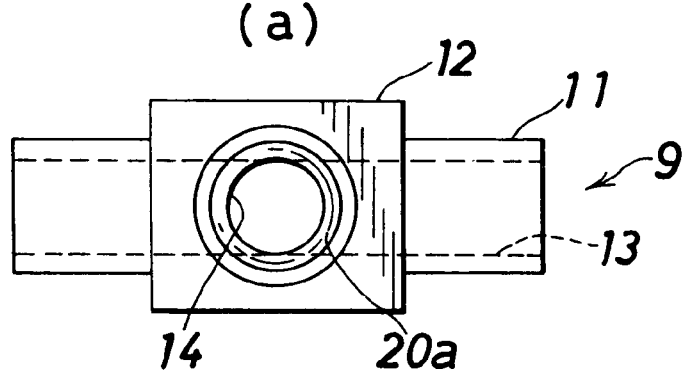
FIG. 4 is a view showing one example of a line-to-line connection path forming member.
Figure 4:
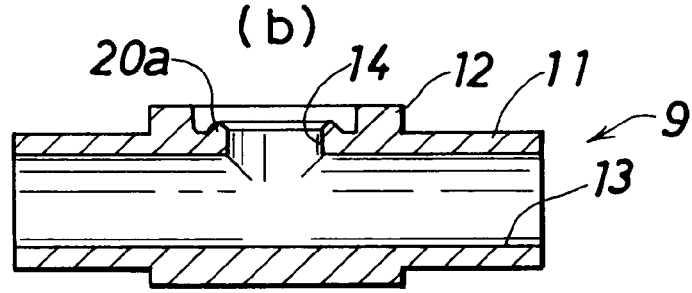

As shown in FIG. 4 in detail, according to the T-shaped path forming member (9), a flange (12) having a rectangular cross section is formed at the center of a cylindrical body (11) to be supported by the stepped parts (7a) of the joint members (7) and an upward opening path (14) penetrates the flange (12), whereby a T-shaped path (13) having openings at both ends in the direction perpendicular to the line and at an upper part is formed across the lines. An annular gasket holding projection (20a) constituting the seal 20 is provided at the opening of the upward opening path (14).

Figure 5:
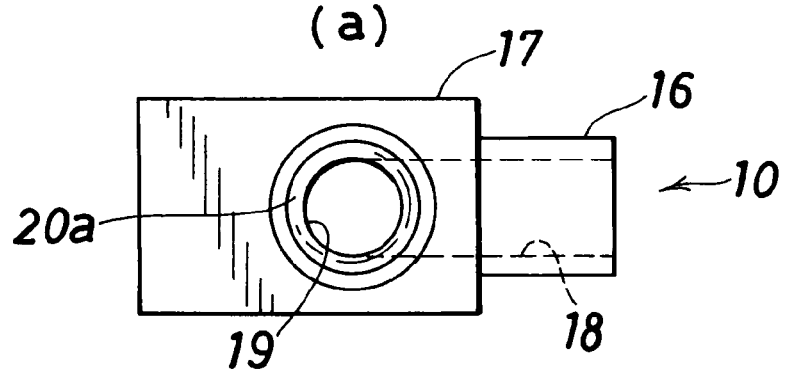
FIG. 5 is a view showing another example of the line-to-line connection path forming member.
Figure 5:
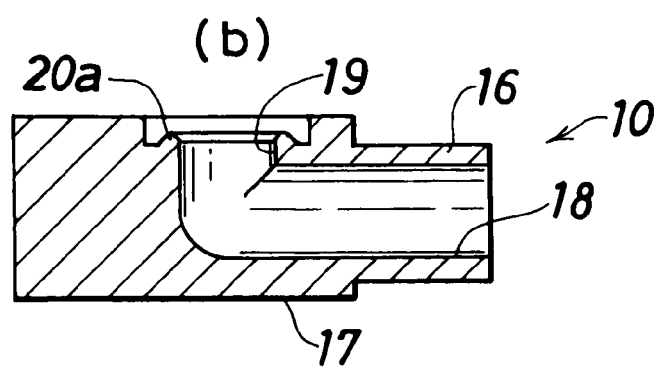

As shown in FIG. 5 in detail, according to the L-shaped path forming member (10), a flange (17) having a rectangular cross section is formed on one side of a cylindrical body (16) to be supported by the stepped parts (7a) of the joint members (7), an upward opening path (19) penetrates the flange (17) and a part outside the upward opening path (19) is closed, whereby an L-shaped path (18) having a closed part at one end and has openings at the other end in the direction perpendicular to the line and at an upper part is formed across the lines. In addition, an annular gasket holding projection (20a) constituting the seal (20) is provided at the opening of the upward opening path (19).

The line-to-line connection path forming members (9) and (10) constituting the line-to-line connecting means (7) are welded to each other. Here, it is to be noted that only one kind is prepared for each of the path forming members (9) and (10) (the length thereof is the same) and a length adjustment tube having the same diameter as that of the cylinders (11) and (16) of the path forming members (9) and (10), respectively is interposed between the adjacent path forming members (9) and (10) according to need.

As shown in FIG. 1, each of the joint members (6) and (7) includes a V-shaped path (21) having two upward openings (21a) and (21b) aligned in the line direction. Furthermore, as shown in FIG. 3, each of the joint members (6) and (7) includes two through holes (22) aligned in the direction perpendicular to the line direction across the V-shaped path (21) and four female screw holes (23) are provided at four corners. Thus, each of the joint members (6) and (7) is fixed to a base member by a bolt disposed in each through hole (22), and the fluid controllers (2) and (3) are fixed to the joint members (6) and (7) by bolts (screw members) (24) penetrating from the above and screwed in the female screw holes (23) of the joint members (6) and (7).

The line-to-line connection path forming members (9) and (10) constituting the line-to-line connecting means (8) are provided between the lower surface of the fluid controller (3) and the bottom surface of the stepped part (7a) of the joint member (7), and held between them by the bolts (24) for fixing the fluid controller (3) to the joint member (7). Consequently, a female screw is not provided in the path forming members (9) and (10) and the path forming members (9) and

(10) are fixed by the four bolts (24) for fixing the fluid controller (3) having the three ports. As a result, the number of bolts (24) used in the fluid controller (2) having the two ports and used in the fluid controller (3) having the three ports is four. In addition, each processing accuracy of the stepped part (7a) of the joint member (7) and the path forming members (9) and (10) is set so that a predetermined pressure is applied to the seal (20) between each of the upward opening paths (14) and (19) of the path forming members (9) and (10) and the line-to-line connection port (3c) of the fluid controller (3) when the fluid controller (3) having the three ports is screwed with the bolts (24), and as a result, sealing accuracy can be ensured even when the path forming members (9) and (10) are not fastened with bolts.

According to the conventional fluid control device, since the path forming member to connect the lines is also provided between the fluid controller and the base member and fixed by bolts penetrating the fluid controller from the above and screwed in the female screw hole of the joint member similar to the other joint members, the number of used bolts is also four in the case of the fluid controller having the two ports, but the number of used bolts is six in the case of the fluid controller having the three ports. Meanwhile, according to the fluid control device in the present invention, as described above, since the path forming members (9) and (10) for connecting the lines are disposed on the stepped parts (7a) of the pair of joint members (7), a length in the line direction required for the path forming members (9) and (10) to connect the lines is reduced and the device can be miniaturized, and since the number of bolts (24) is reduced, the fluid control device can be low in cost and easily assembled and reduced in weight.

Figure 6:
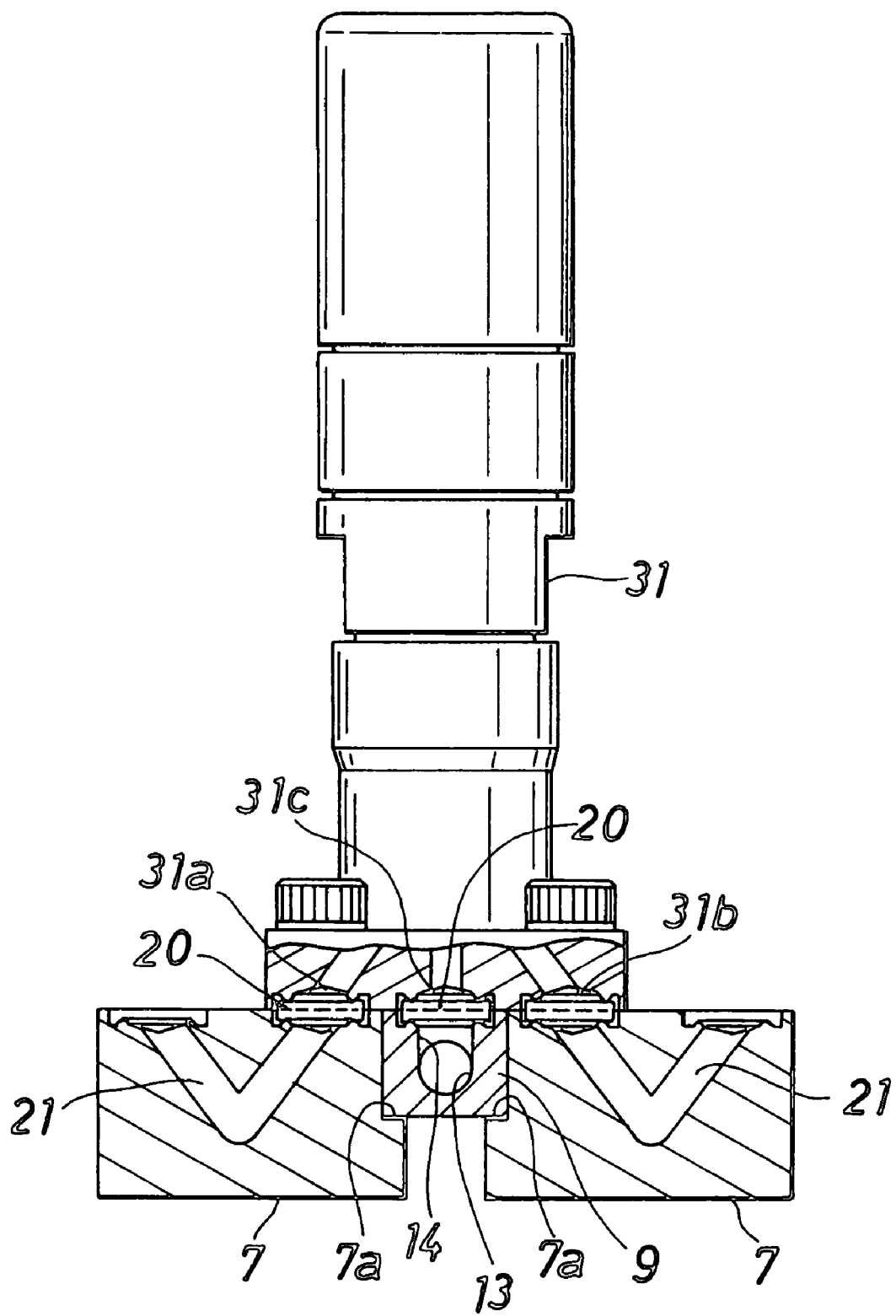
FIG. 6 is a vertical sectional view showing an essential part of a fluid control device according to another embodiment of the present invention.

Although the fluid controllers (2) and (3) having two and three ports (2a), (2b), (3a), (3b) and (3C), respectively are shown in the above embodiment as the path blocks, an on-off valve (31) having three ports (31a), (31b) and (31c) may be used as the fluid controller having three ports. This is shown in FIG. 6. In addition, the same references are allotted to the same components as in the first embodiment and their description will be omitted.

Referring to FIG. 6, the fluid controller (31) arranged on the upper side is an on-off valve having the inlet port (31a) and the outlet port (31b) aligned across the line-to-line connection port (31c) in the line direction, in which the inlet port (31a) communicates with a V-shaped path (21) of one joint member (7) supporting the on-off valve (31) and the outlet port (31b) communicates with a V-shaped path (21) of the other joint member (7) supporting the on-off valve (31). According to the on-off valve (31), its inlet port (31a) is closed and opened by its actuator (not shown) and the inlet port (31a) of the on-off valve (31) is always in communication with the outlet port (31b) and the line-to-line connection port (31c).

The fluid controller includes an on-off valve having two ports, a mass flow controller, a regulator other than the on-off valve (31) having the three ports (31a), (31b) and (31c), and when the fluid controllers (2) and (3) shown in FIG. 1 are appropriately replaced with the above fluid controller, the fluid control device can be small in size and light in weight.

In addition, although the paths (21) formed in the joint members (6) and (7) are V-shaped in the above, it is a matter of course that the shape may be a U shape.

INDUSTRIAL APPLICABILITY

The present invention provides a fluid control device used in a semiconductor manufacturing device or the like. According to the present invention, the fluid control device can be small in size without degrading its performance.

The invention claimed is:

1. A fluid control device comprising parallel lines each composed of a plurality of fluid controllers arranged on the upper side and a plurality of joint members arranged on the lower side to connect the fluid controllers, and line-to-line connecting means for connecting flow paths of the predetermined lines, wherein
the fluid controller having an inlet port and an outlet port arranged in a line direction and a line-to-line connection port positioned at the middle of the above ports in the line direction is supported by the pair of joint members, a stepped part is formed at each upper surface of opposed parts of the joint members, and a line-to-line connection path forming member having an upward opening path communicating with the line-to-line connection port of the fluid controller to constitute the line-to-line connecting means is supported by the stepped parts of the joint members.

2. The fluid control device according to claim 1, wherein the line-to-line connection path forming member is held between the fluid controller and the joint member by screwing a screw member for fixing the fluid controller to the joint member.

3. The fluid control device according to claim 2, wherein the fluid controller having the line-to-line connection port comprises an on-off valve having an inlet port and an outlet port aligned in the line direction across a line-to-line connection port, in which a path communicating with the inlet port is provided in one of the adjacent joint members supporting the fluid controller and a path communicating with the outlet port is formed in the other joint member and the inlet port of the on-off valve is always in communication with the line-to-line connection port.

4. The fluid control device according to claim 1, wherein the path forming member constituting the line-to-line connecting means comprises a T-shaped path forming member having a T-shaped path having openings at both ends in the direction perpendicular to the line and an upward opening, and an L-shaped path forming member having an L-shaped path having one closed end in the direction perpendicular to the lines and having an opening at the other end and an upward opening, and the line-to-line connecting means is constituted by interposing at least one T-shaped path forming member between the two L-shaped path forming members.

5. The fluid control device according to claim 4, wherein the fluid controller having the line-to-line connection port comprises an on-off valve having an inlet port and an outlet port aligned in the line direction across a line-to-line connection port, in which a path communicating with the inlet port is provided in one of the adjacent joint members supporting the fluid controller and a path communicating with the outlet port is formed in the other joint member and the inlet port of the on-off valve is always in communication with the line-to-line connection port.

6. The fluid control device according to claim 1, wherein the fluid controller having the line-to-line connection port comprises an on-off valve having an inlet port and an outlet port aligned in the line direction across a line-to-line connection port, in which a path communicating with the inlet port is provided in one of the adjacent joint members supporting the fluid controller and a path communicating with the outlet port is formed in the other joint member and the inlet port of the on-off valve is always in communication with the line-to-line connection port.

* * * * *